(12) United States Patent
Takata et al.

(10) Patent No.: US 11,106,635 B2
(45) Date of Patent: Aug. 31, 2021

(54) COMPUTER SYSTEM, FILE STORAGE CONTROLLER, AND DATA SHARING METHOD

(71) Applicant: Hitachi, Ltd., Tokyo (JP)

(72) Inventors: Masanori Takata, Tokyo (JP); Akiyoshi Tsuchiya, Tokyo (JP); Hitoshi Kamei, Tokyo (JP); Hitoshi Arai, Tokyo (JP); Yoji Nakatani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1053 days.

(21) Appl. No.: 15/541,588

(22) PCT Filed: Jan. 30, 2015

(86) PCT No.: PCT/JP2015/052623
§ 371 (c)(1),
(2) Date: Jul. 5, 2017

(87) PCT Pub. No.: WO2016/121084
PCT Pub. Date: Aug. 4, 2016

(65) Prior Publication Data
US 2017/0351700 A1    Dec. 7, 2017

(51) Int. Cl.
*G06F 16/00*    (2019.01)
*G06F 16/178*    (2019.01)
(Continued)

(52) U.S. Cl.
CPC .............. *G06F 16/178* (2019.01); *G06F 3/06* (2013.01); *G06F 11/14* (2013.01);
(Continued)

(58) Field of Classification Search
CPC .. G06F 11/14; G06F 11/1662; G06F 11/2094; G06F 12/00; G06F 13/10;
(Continued)

(56) References Cited

U.S. PATENT DOCUMENTS 8,301,602 B1 * 10/2012 Jiang .................. G06F 16/17
707/649
2010/0235326 A1 * 9/2010 Fashchik ............. G06F 16/2358
707/656
(Continued)

FOREIGN PATENT DOCUMENTS

JP    2000-339211 A    12/2000
JP    2003-242016 A    8/2003
(Continued)

OTHER PUBLICATIONS

International Search Report and Written Opinion for PCT App No. PCT/JP2015/052623 dated Apr. 7, 2015, 10 pgs.

*Primary Examiner* — Dinku W Gebresenbet
(74) *Attorney, Agent, or Firm* — Procopio, Cory, Hargreaves & Savitch LLP

(57) ABSTRACT

Each file storage apparatus of a plurality of file storage apparatuses stores a file system, and associates and stores paths of elements in the file system and archive destinations of the elements in an archive storage apparatus. When the file system is operated, each file storage apparatus transmits archive data of an element as an operation target, and operation information including operation details to the archive storage apparatus. The archive storage apparatus receives the archive data and the operation information, stores the archive data, and stores consistency information including the operation information and archive versions indicating a reception order of the operation information. A first file storage apparatus executes a synchronization process of acquiring the consistency information from the archive storage apparatus, correcting inconsistency between the acquired consistency information and consistency infor- (Continued)

mation including archive versions earlier than the acquired consistency information, and reflecting the file system on the consistency information.

11 Claims, 12 Drawing Sheets

(51) Int. Cl.
| | |
|---|---|
| *G06F 16/27* | (2019.01) |
| *G06F 13/10* | (2006.01) |
| *G06F 11/20* | (2006.01) |
| *G06F 11/16* | (2006.01) |
| *G06F 11/14* | (2006.01) |
| *G06F 16/18* | (2019.01) |
| *G06F 3/06* | (2006.01) |
| *G06F 12/00* | (2006.01) |
| *H04L 29/08* | (2006.01) |

(52) U.S. Cl.
CPC ...... *G06F 11/1662* (2013.01); *G06F 11/2094* (2013.01); *G06F 12/00* (2013.01); *G06F 13/10* (2013.01); *G06F 16/1873* (2019.01); *G06F 16/27* (2019.01); *H04L 67/1095* (2013.01); *H04L 67/1097* (2013.01); *G06F 2201/82* (2013.01)

(58) Field of Classification Search
CPC .... G06F 16/178; G06F 16/1873; G06F 16/27; G06F 2201/82; G06F 3/06; H04L 67/1095; H04L 67/1097
See application file for complete search history.

(56) References Cited

U.S. PATENT DOCUMENTS

| | | | |
|---|---|---|---|
| 2012/0089569 A1 | 4/2012 | Mason, Jr. et al. | |
| 2012/0259813 A1* | 10/2012 | Takata | G06F 3/0649 707/622 |
| 2013/0282662 A1* | 10/2013 | Kumarasamy | G06F 11/1451 707/649 |
| 2014/0226553 A1* | 8/2014 | Ko | H04W 56/002 370/312 |
| 2015/0358408 A1 | 12/2015 | Fukatani | |

FOREIGN PATENT DOCUMENTS

| | | |
|---|---|---|
| JP | 2014-503086 A | 2/2014 |
| WO | 2014128819 A1 | 8/2014 |

* cited by examiner

Fig. 5

| NAS identifier | Registered version | Update path | Operation type |
|---|---|---|---|
| B | v1 | /dir00/file01 | Update |

Operation list

Fig. 6

| Version ID | NAS identifier | Registered version | Update path | Operation type | Update date and time | Rotation flag |
|---|---|---|---|---|---|---|
| v1 | A | - | /dir00 /dir00/file00 /dir00/file01 | Create file | 2015/01/30 12:00:00 | 0 |
| v2 | A | v1 | /dir00 -> /dir01 | Change name | 2015/01/30 12:00:12 | 0 |
| v3 | B | v1 | /dir00/file01 | Update file | 2015/01/30 12:00:20 | 0 |
| v4 | C | v3 | /dir01/file01 | Update file | 2015/01/30 12:00:25 | 0 |

Consistency checklist group

Fig. 7

| Version ID | Size | Content hash value | Update date and time | Rotation flag |
|---|---|---|---|---|
| v1 | 100 | abc123 | 2015/01/30 12:00:00 | 0 |
| v2 | 200 | def456 | 2015/01/30 12:00:12 | 0 |
| v3 | 300 | ghi789 | 2015/01/30 12:00:20 | 0 |
| v4 | 400 | jkl101 | 2015/01/30 12:00:25 | 0 |

Version management table

COMPUTER SYSTEM, FILE STORAGE CONTROLLER, AND DATA SHARING METHOD

CROSS-REFERENCE TO RELATED APPLICATIONS

This application is a U.S. National Stage entry of PCT Application No. PCT/JP2015/052623, filed on Jan. 30, 2015, the contents of the foregoing are incorporated by reference.

TECHNICAL FIELD

The present invention relates to a technique for sharing data between a plurality of file storage apparatuses.

BACKGROUND ART

There is a known computer system, in which storage apparatuses respectively installed at a plurality of sites are coupled to an archive storage apparatus to realize data sharing between the storage apparatuses.

For example, PTL 1 discloses a technique, in which only a storage apparatus at one predetermined site among storage apparatuses at a plurality of sites transmits archive data to an archive storage apparatus.

Furthermore, for example, PTL 2 discloses a technique, in which to prevent a plurality of storage apparatuses from updating data in an archive storage apparatus at the same time, transmission of archive data from the storage apparatuses other than the storage apparatus at a transmission source of archive data is locked in relation to data being updated by the archive storage apparatus. In the technique, when client devices of the other storage apparatuses update data of the client devices, the client devices reflect the archive data in the archive storage apparatus on the data of the client devices and update the data after the reflection.

CITATION LIST

Patent Literature

[PTL 1] National Publication of International Patent Application No. 2014-503086
[PTL 2] U.S. Patent No. 2012/0089569

SUMMARY OF INVENTION

Technical Problem

However, according to the technique of PTL 1, the storage apparatuses at the other sites cannot transmit the archive data, and only the data from one site is shared by the storage apparatuses at a plurality of sites through the archive storage apparatus.

In addition, according to the technique of PTL 2, when a client further updates the data updated by another storage apparatus, the storage apparatus of the client needs to reflect the archive data from the archive storage apparatus, and this causes the client to wait.

Therefore, a waiting time of a client for updating data is a problem in a computer system that can transmit archive data from a plurality of storage apparatuses.

Solution to Problem

To solve the problem, a computer system according to the present invention includes: a plurality of file storage apparatuses; and an archive storage apparatus coupled to the plurality of file storage apparatuses. The file storage apparatus is configured to store a file system and associate and store paths of elements in the file system and archive destinations of the elements in the archive storage apparatus. When the file system is operated, each file storage apparatus is configured to transmit, to the archive storage apparatus, archive data of an element as a target of the operation and operation information including a path to the target and details of the operation. The archive storage apparatus is configured to receive the archive data and the operation information, store the archive data, and store consistency information including the operation information and archive versions indicating an order of reception of the operation information. A first file storage apparatus of the plurality of file storage apparatuses is configured to execute a synchronization process of acquiring the consistency information from the archive storage apparatus, correcting inconsistency between the acquired consistency information and consistency information including archive versions earlier than the acquired consistency information, and reflecting the file system on the consistency information.

Advantageous Effects of Invention

The computer system of the present invention can reduce the waiting time for operating the file system and can maintain consistency of data according to the order of reception of the archive data in the archive storage apparatus.

BRIEF DESCRIPTION OF DRAWINGS

FIG. 5 is an example of an operation list 500.
FIG. 6 is an example of a consistency checklist group 410.
FIG. 7 is an example of a version management table 411.

DESCRIPTION OF EMBODIMENTS

Hereinafter, an Embodiment will be described with reference to the drawings.

Note that although an expression "aaa table" may be used to describe various pieces of information in the following description, the various pieces of information may be expressed by data structures other than the table. To indicate that the various pieces of information do not depend on the data structure, the "aaa table" can be called "aaa information". Furthermore, when a program or software is the subject in the description, it is understood that a processor or the like actually executes the program or the software.

Although expressions, such as "identifier", "name", and "ID" regarding identification information, are used to describe details of each piece of information, the expressions can be replaced with each other. Many types of identification information may be used in place of at least one of these.

Furthermore, although a "program" may serve as the subject in describing a process in the following description, the subject of the process may be a processor because the processor executes the program to execute a predetermined process while appropriately using a storage resource (for example, memory) and/or a communication interface device (for example, communication port). Conversely, it can be interpreted that a process in which the processor is the subject can be performed by executing one or more programs. Although the processor is typically a microprocessor, such as a CPU (Central Processing Unit), the processor may include a hardware circuit that executes part of the process (for example, encryption/decryption or compression/decompression).

Furthermore, in the following description, reference signs may be used to describe the same types of elements without distinguishing the elements, and identifiers (for example, at least one of numbers and signs) allocated to the elements may be used in place of the reference signs of the elements to describe the same types of elements without distinguishing the elements.

Figure 1:
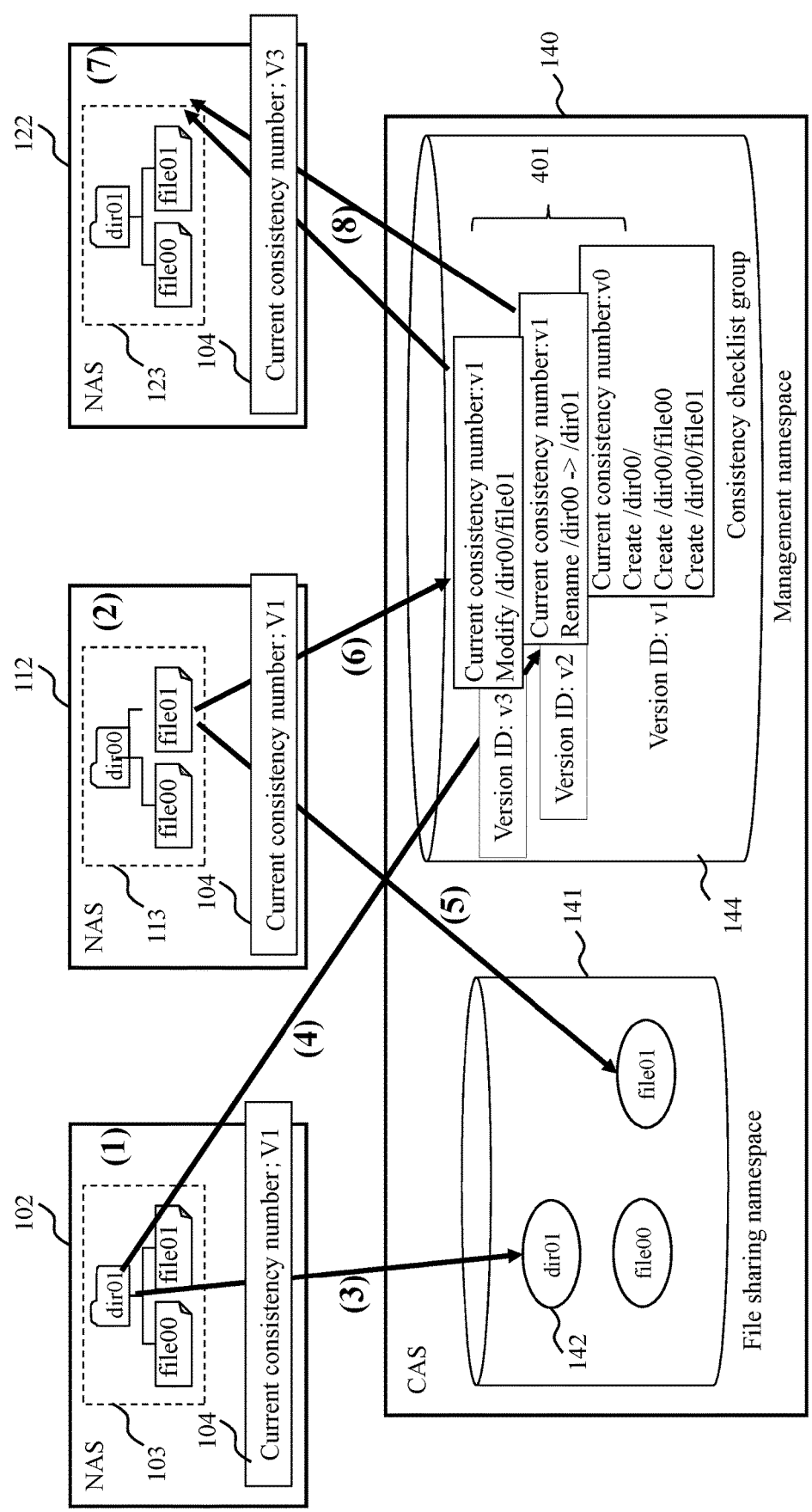
FIG. 1 is a diagram describing an example of an outline of the present Embodiment.

FIG. 1 is a diagram describing an example of an outline of the present Embodiment.

A computer system of the present Embodiment includes: NAS (Network Attached Storage) devices 102, 112, and 122 as an example of a plurality of file storage apparatuses; and a CAS (Content Aware Storage) device 140 as an example of an archive storage apparatus. The plurality of NAS devices 102, 112, and 122 provide a file sharing service in cooperation with the CAS device 140. The file sharing service is a service in which the NAS devices 102, 112, and 122 store file systems 103, 113, and 123, respectively, and data in the file systems 103, 113, and 123 are synchronized with the CAS device 140 to thereby share the data. The NAS devices 102, 112, and 122 can execute operations for files and directories that are elements in the file systems 103, 113, and 123, respectively. In this case, instead of locking elements on the CAS device 140 corresponding to the elements in the file systems 103, 113, and 123 as operation targets and permitting the operations after synchronizing the data, the elements are operated based on the data in the file systems 103, 113, and 123. By permitting the operations of the elements in the file systems 103, 113, and 123 without the lock and the synchronization, the time for waiting for unlocking in the other NAS devices 103, 113, and 123 and the time for waiting for the synchronization of the data are eliminated, and the operations for the elements can be executed in a short time. Then, the operated elements are archived in the CAS device 140 asynchronously with the operations. Note that the archive here denotes copying of the data in the file or the directory on the file system to the CAS device 140. The data copied at this point will be called archive data.

The CAS device 140 includes namespaces, such as a file sharing namespace 141 and a management namespace 144. The namespaces are non-tiered areas for storing objects. The CAS device 140 stores, as objects, the archive data in the file sharing namespace 141.

The CAS device 140 stores, as an object, a consistency checklist group 410 that is a set of consistency checklists in the management namespace 144. The consistency checklists are an example of consistency information including, for example, operation information including details of the operations performed for the file systems 103, 113, and 123 by the NAS devices 102, 112, and 122 and archive versions indicating the order of reception of the operation information by the CAS device 140. The details of the operations include targets and types of the operations. Note that, for example, the operation information corresponds to an operation list and the like described later, and the archive versions correspond to version IDs 501 and the like described later.

The CAS device 140 stores, as an object, the version list in the management namespace 144. The version list is a list for managing the version IDs 501 included in the consistency checklist in the order of version. For example, the version list corresponds to a version management table 411 and the like described later.

The NAS devices 102, 112, and 122 transmit and receive various pieces of data to and from the CAS device 140. Transmission of information and data to the CAS device 140, that is, uploading of data to the CAS device 140, will be referred to as PUT in some cases. Furthermore, reception of various pieces of data from the CAS device 140, that is, downloading of data of an object in the CAS device 140, will be referred to as GET in some cases. Each object is provided with an object ID such as a URL, for example. The NAS devices 102, 112, and 122 designate the object ID to access the archive data.

Note that the NAS devices 102, 112, and 122 store association of paths to the files and the directories of the file systems 103, 113, and 123 with the object IDs of the objects in the file sharing namespace 141 of the CAS device 140.

The CAS device 140 generates consistency checklists by providing operation lists received from the NAS devices with version IDs indicating the order of reception of the operation lists and stores the consistency checklists. Note that the operation lists are information PUT to the CAS device 140 along with the archive data. In this way, the state of the file sharing namespace 141 different in each version is managed.

When the file system of a certain NAS device is operated, the NAS device PUTS the archive data of the file and the directory as operation targets to the CAS device 140.

Furthermore, the NAS devices 102, 112, and 122 in the computer system execute a synchronization process of acquiring the consistency checklists from the CAS device 140 regularly or at a predetermined timing and sequentially reflecting the details of the operations included in the acquired consistency checklists on the file systems of the NAS devices 102, 112, and 122 based on the objects in the file sharing namespace 141. Here, the operations included in the PUT archive data and operation lists are operated without locking and synchronizing the objects of the operation targets on the CAS device 140. Therefore, as the plurality of NAS devices 102, 112, and 122 operate related elements at the same time, the operations are not consistent in some cases. Therefore, the NAS devices 102, 112, and 122 execute the synchronization process by reflecting the operations while correcting the inconsistency in the consistency checklists. The data in the file systems finished with the synchronization process coincide with the archive data in the file sharing namespace 141. As a result, the file systems 103, 113, and 123 of the plurality of NAS devices 102, 112, and 122 can share the data in the file sharing namespace 141.

Furthermore, each of the NAS devices 102, 112, and 122 stores a current version. The current version is a version ID included in the latest consistency checklist among the consistency checklists finished with the reflection. For example, the current version corresponds to Current Consistency Number described later.

In a specific example described below, it is assumed that each NAS device 102 stores a file system including a directory dir00 and files file00 and file01 under the directory dir00 in an initial state. It is assumed that the version ID provided to the latest consistency checklist stored in the management namespace 144 is "V1". It is assumed that in the initial state, the Current Consistency Numbers 104 included in the NAS devices 102, 112, and 122 are all "V1". This indicates that the data in the file sharing namespace 141 are all reflected on the file systems 103, 113, and 123 of the NAS devices 102, 112, and 122, that is, the synchronization process is finished. Hereinafter, a data sharing method of the present Embodiment will be described based on the specific example.

The specific example will be described. (1) A client performs an operation for the file system 103. The details of the operation are, for example, "change name" (Rename /dir00→dir01) in the directory dir00 of the file system 103 of the NAS device 102 that is the operation target.

(2) Subsequently, the client performs an operation for the file system 113. Details of the operation are, for example, "update file" (Modify /dir00/file01) in the file 01 under dir00 of the file system 113 of the NAS device 112 that is the operation target.

(3) The NAS device 102 designates the object ID of dir00 that is the operation target and PUTS the archive data of dir00 after the operation to the CAS device 140. As a result, dir00 of the file sharing namespace 141 is changed to dir01.

(4) The NAS device 102 designates the object ID of the consistency checklist group 410 of the management namespace 144 and PUTS the operation list indicating the change name of dir00 to the CAS device 140. The Current Consistency Number (V1) of the NAS device at the time of the operation is managed as the registered version in the operation list. The CAS device 140 stores, in the management namespace 144, the consistency checklist as the consistency checklist group 410 in which the version ID (V2) is provided to the operation list.

(5) The NAS device 112 designates the object ID of the target of the file sharing namespace 141 of the CAS device 140 and PUTS the archive data of file01 after the operation of the file system 103 of the NAS device 112 to the CAS device 140. As a result, file01 of the file sharing namespace 141 is updated. Note that in the "update file", the file may be overwritten by the transmitted archive data, or difference data before and after the update may be managed to perform generation management of the files, for example.

(6) The NAS device 112 designates the object ID of the consistency checklist group 410 of the management namespace 144 and PUTS the operation list indicating the update file of file01 to the CAS device 140. The Current Consistency Number (V1) of the NAS device at the time of the operation is managed as the registered version in the operation list. The CAS device 140 stores, in the management namespace 144, the consistency checklist as the consistency checklist group 410 in which the version ID (V3) is provided to the operation list.

(7) When a preset condition is met, the NAS device 122 executes a synchronization process. (7) and (8) describe the synchronization process of the NAS device 122. In this case, the NAS device 122 designates the object ID of the consistency checklist group 410 to GET the consistency checklist from the management namespace 144 of the CAS device 140. Specifically, for example, the NAS device 122 GETs the consistency checklist including the version ID next to the Current Consistency Number (V1) of the NAS device 122. Here, the consistency checklist of V2 is GET.

Here, the NAS device 122 compares the Current Consistency Number (V1) of the NAS device 122 with the registered version (V1) in the consistency checklist. Here, the registered version and the Current Consistency Number of the NAS device 122 have the same version number, and this indicates that the state of the file system 103 of the NAS device 102 at the time of the operation and the state of the file system 123 of the NAS device 122 are the same. Therefore, the coherence of data can be maintained even when the obtained consistency checklist is reflected on the file system 123.

Then, the NAS device 122 reflects the details of the operation of the consistency checklist with the version ID V2 on the file system 123. The NAS device 122 changes the Current Consistency Number (V1) of the NAS device 122 to the version ID (V2) of the consistency checklist reflected in (7).

(8) Subsequently, the NAS device 122 GETs the consistency checklist from the management namespace 144 of the CAS device 140. Specifically, for example, the NAS device 122 GETs the consistency checklist with the version ID next to the Current Consistency Number (V2) of the NAS device 122. Here, the consistency checklist of V3 is obtained.

Here, the NAS device 122 compares the Current Consistency Number (V2) of the NAS device 122 with the registered version (V1) in the consistency checklist. Here, the registered version is a version number older than the Current Consistency Number of the NAS device 122, and the file system 123 of the NAS device 122 is in a state (V2) newer than the state (V1) of the file system 113 of the NAS device 112 at the time of the operation. That is, the consistency checklist of V2 and the consistency checklist of V3 are inconsistent, and the reflection in this state may not be able to maintain the coherence of the file system 123. Therefore, the details of the consistency checklist operation of V3 are included in the already reflected details of the operation of the consistency checklist of V2. Specifically, for example, when the details of the operation of the consistency checklist of V3 are update file of file01 under dir00 (Modify /dir00/file01), and the details of the operation of the consistency checklist of V2 are change name of dir00 (Rename /dir00→dir01), the operation target of the consistency checklist of V3 is rewritten with "dir01/file01" based on the operation target "dir01" of the consistency checklist of V2. As a result, the detail of the operation of the consistency checklist of V3 after the reflection is update file of file01 under dir01 (Modify /dir01/file01).

The NAS device 122 can rewrite the target of the consistency checklist operation of V3 with the operation target of V2 after reflecting the details of the operation of V2 to thereby reflect the V3 operation on the operation target after the rewriting. The NAS device 122 changes the Current Consistency Number (V3) of the NAS device 122 to the version ID (V3) of the consistency checklist used in the synchronization process.

The process described above can reduce the waiting time for the operations of the file systems in a computer system 10 including the plurality of NAS devices 102, 112, and 122 and can maintain the coherence of data according to the order of reception of the archive data in the CAS device 140. Furthermore, when the registered version of the obtained consistency checklist is older than the Current Consistency Number of the NAS device, the acquired target of the consistency checklist operation can be rewritten with the operation target of the consistency checklist already reflected on the file system to thereby maintain the coherence of data even when the file system operated from a version earlier than the state of the current version is reflected.

Figure 2:
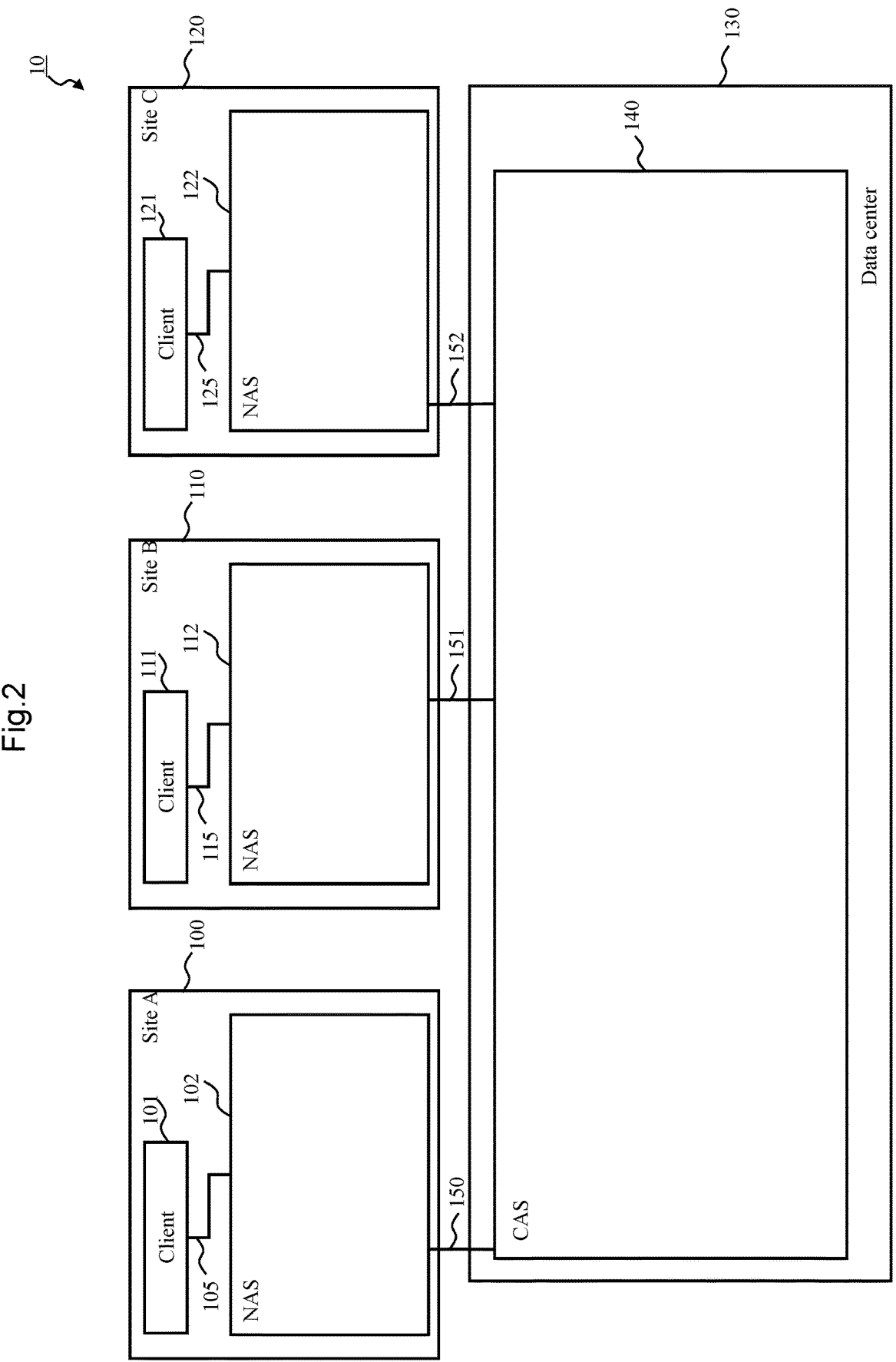
FIG. 2 is an example of a configuration diagram of a computer system according to the present Embodiment.

FIG. 2 is an example of a configuration diagram of the computer system according to the present Embodiment.

The computer system 10 includes one or a plurality of sub computer systems 100, 110, and 120 arranged at respective sites and a data center system 130. The CAS device 140 is installed on the data center system 130.

Note that the sub computer systems at the respective sites may have similar configurations. Hereinafter, the configuration of the sub computer system 100 arranged at a site A will be representatively described. For the sub computer systems 110 and 120 not described, the following description can be read by providing signs of constituent elements in the respective systems.

The sub computer system 100 includes a client 101 and the NAS device 102. The client 101 and the NAS device 102 are coupled through a network 105 such as a LAN (Local Area Network) in the site. The client 101 is one or a plurality of computers. The client 101 uses the file sharing service provided by the NAS device 102 through, for example, the network 105 using a file sharing protocol such as an NFS (Network File System) and a CIFS (Common Internet File System).

The NAS devices 102, 112, and 122 at the respective sites are coupled to the CAS device 140 of the data center system 130 through networks 150, 151, and 152, such as a WAN (Wide Area Network), for example. For example, the NAS devices 102, 112, and 112 access the CAS device 140 by using a protocol such as an HTTP (Hypertext Transfer Protocol), for example.

Note that although the computer system 10 includes three sites (A, B, and C) in the example described in the present Embodiment, the number of sites in the computer system 10 may be any number.

Note that the types of the networks 105, 115, 125, 150, 151, and 152 are not limited to the networks described above, and various networks can be used.

Figure 3:
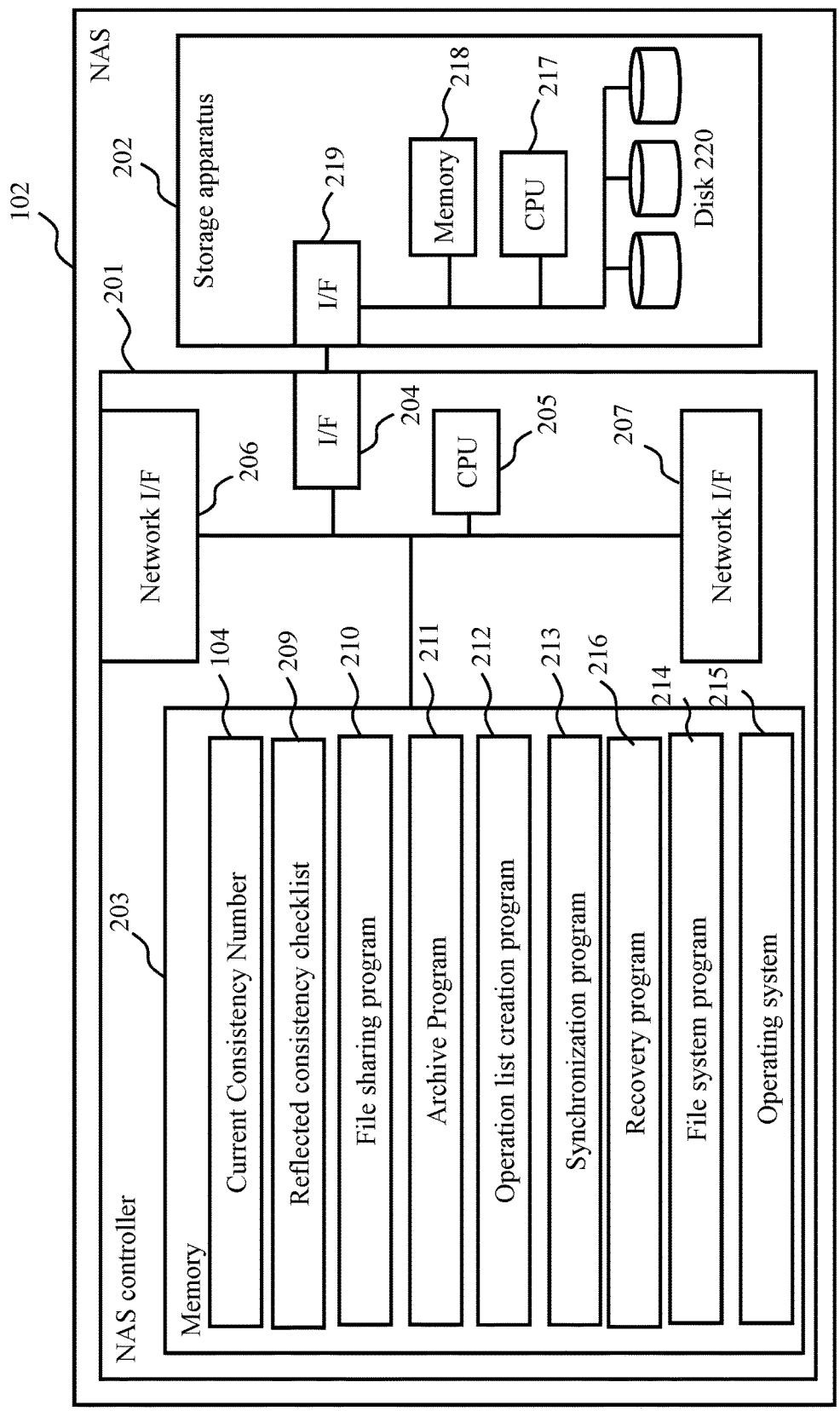
FIG. 3 is a configuration diagram of an NAS device.

FIG. 3 is a configuration diagram of the NAS device. Note that although FIG. 3 shows the configuration of the NAS device 102 at the site A, and only the NAS device 102 at the site A will be described below, the NAS devices 112 and 122 at the other sites B and C also have similar configurations.

The NAS device 102 includes an NAS controller 201 and a storage apparatus 202. The NAS controller 201 includes a memory 203, a CPU 205, network interfaces (I/Fs) 206 and 207, and an interface 204. These are coupled to each other through a communication path such as a bus, for example. The CPU 402 executes programs stored in the memory 403. The network I/F 206 is an interface for communicating with the client 101 through the network 105. The network I/F 207 is an interface for communicating with the data center system 130 through the network 150. The I/F 204 is an interface coupled to an I/F 219 for mutual communication with the storage apparatus 202.

The memory 203 stores programs and information for controlling the NAS device 102. Specifically, the memory 203 stores, for example, the Current Consistency Number 104, a reflected consistency checklist 209, a file sharing program 210, an archive program 211, an operation list creation program 212, a synchronization program 213, a recovery program 216, a file system program 214, and an operating system (OS) 215. Note that the programs and the information stored in the memory 203 may be stored in the storage apparatus 202. In this case, the CPU 205 reads them to the memory 203 to execute them.

The Current Consistency Number 104 indicates up to which version of the consistency checklist is reflected on the file system of the NAS device 102. The reflected consistency checklist 209 is a consistency checklist acquired from the CAS device 140, in which the reflection on the file system is finished. The reflected consistency checklist 209 is saved for a certain period or a certain amount to avoid waste of acquiring the consistency checklist again from the CAS device 140.

The file sharing program 210 is a program for providing an interface using a file sharing protocol between the NAS device 102 and the client 101. The archive program 211 is a program for archiving, in the CAS device 140, the directory or the file operated on the client 101. The operation list creation program 212 is a program for creating an operation list including the details of the operation for the file or the directory of the NAS device 102. The synchronization program 213 is a program for reflecting the operation of the consistency checklist acquired from the CAS device 140 on the file system of the NAS device 102. The file system program 214 is a program for controlling the file system 103. The recovery program 216 is a program for executing a recovery process of the NAS device 102.

The storage apparatus 202 includes a memory 218, a CPU 217, and the I/F 219. These are coupled to each other through a communication path such as a bus. The I/F 219 is an interface used for the coupling with the NAS controller 201. Programs and data are stored in the memory 218 and disks 220. The CPU 217 executes the programs in the memory 218 based on the commands from the NAS controller 201. The storage apparatus 202 may provide a storage function in a block format, such as an FC-SAN (Fibre Channel Storage Area Network), to the NAS controller 201.

Figure 4:
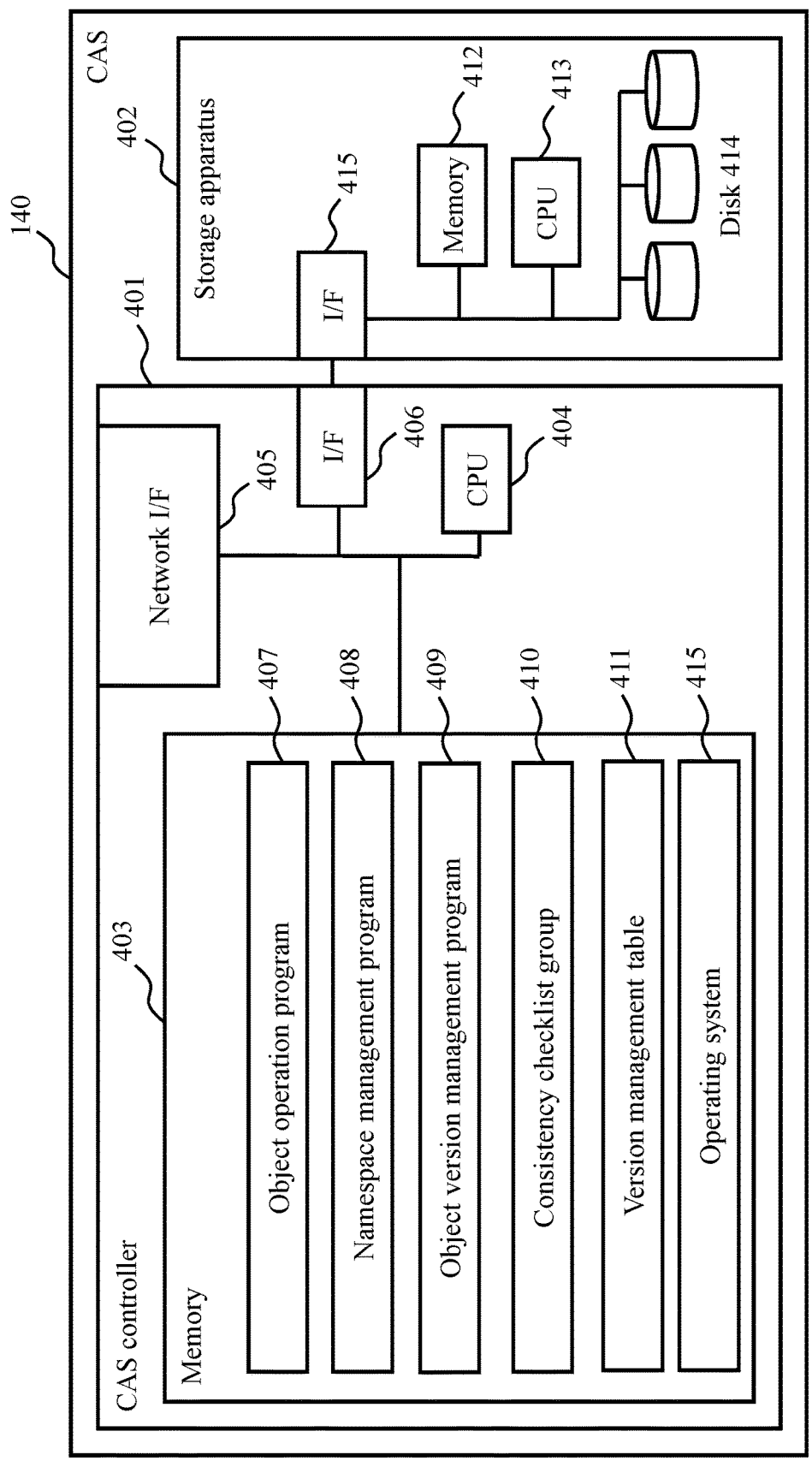
FIG. 4 is a configuration diagram of a CAS device 140.

FIG. 4 is a configuration diagram of the CAS device 140. The CAS device 140 includes a CAS controller 401 and a storage apparatus 402. The CAS controller 401 includes a memory 403, a CPU 404, a network I/F 405, and an I/F 406. These are coupled to each other through a communication path such as a bus, for example. The CPU 404 executes programs stored in the memory 403. The network I/F 405 is an interface for communicating with the NAS devices 102, 112, and 122 through the networks 150, 151, and 152. The I/F 406 is an interface coupled to the I/F 415 to communicate with the storage apparatus 402.

Programs and information for controlling the CAS device 140 are stored in the memory 403. Specifically, for example, an object operation program 407, a namespace management program 408, an object version management program 409, the consistency checklist group 410, the version management table 411, and an operating system (OS) 415 are stored in the memory 203. Note that the programs and the information stored in the memory 403 may be stored in the storage apparatus 402. In this case, the CPU 404 reads them to the memory 203 to execute them.

The object operation program 407 is a program for processing requests (for example, PUT request and GET request) from the NAS devices 102, 112, and 122. The namespace management program 408 is a program for creating and managing a namespace. The object version management program 409 is a program for providing a version ID to the operation list transmitted along with the archive data to form a consistency checklist to manage the version. The consistency checklist group 410 is a set of consistency checklists generated based on the operation lists transmitted from the NAS and stored in the management namespace 144. The version management table 411 is a table for managing the version IDs 501 of the consistency checklist group 410.

The storage apparatus 402 includes a memory 412, a CPU 413, disks 414, and an I/F 415. These are coupled to each other through a communication path such as a bus, for example. The I/F 415 is an interface used for the coupling with the CAS controller 401. Programs and data are stored in the memory 412 and the disks 414. The CPU 413 executes the programs in the memory 412 based on commands from the CAS controller 401. The storage apparatus 202 may provide a storage function in a block format, such as an FC-SAN, to the CAS controller 401.

FIG. 5 is an example of an operation list 500. The operation list 500 is a list created by each NAS controller 201 in the archive process and transmitted to the CAS controller 401. The operation list 500 is created for each detail of the operation for the file system of the NAS device 102 (or 112 or 122) of the sub computer system. The details of the operation include the type and the target of the operation. An NAS identifier 502 that is an identifier of the NAS device 102 (or 112 or 122) of the sub computer system, a registered version 503 that is the Current Consistency Number 104 stored in the memory 203 of the NAS device at the operation, an update path 504 indicating a path to the operation target, and an operation type 505 that is a type of the operation are stored in the operation list 500. Note that examples of the operation type 505 include create file for newly creating a file, change name of a file or a directory, update file for updating an existing file, delete file for deleting an existing file, and the like.

FIG. 6 is an example of the consistency checklist group 410. Each record of the consistency checklist group 410 is the consistency checklist. Each consistency checklist is managed for each archive version indicating the order of reception of the operation list 500 transmitted along with the archive data. In other words, changes in the state of the file sharing namespace 141 successively updated by the archive data from the NAS devices 102, 112, and 122 are managed based on the versions.

The consistency checklist includes: the version ID 501 indicating the archive version; the NAS identifier 502 that is the identifier of the NAS device of the transmission source of the operation list 500; the registered version 503 indicating the Current Consistency Number 104 at the time of the operation for the file system of the NAS device; the update path 504 indicating the path to the operation target; the operation type 505 that is the type of the operation; an update date and time 506 indicating the date and time of the reception of the archive data of the file or the directory of the operation; and a rotation flag 507 that is a flag for managing the group of the consistency checklists.

FIG. 7 is an example of the version management table 411.

The version management table 411 is a table for managing the version IDs 501 in the consistency checklists. The version management table 411 includes an entry for each version ID 501 of the consistency checklist. Each entry includes: the version ID 501; a size 1102 of the consistency checklist with the version ID 501; a content hash value 1103 indicating a hash value of the consistency checklist with the version ID 501; the update date and time 506 indicating the date and time of the reception of the archive data of the version; and the rotation flag 507 of the consistency checklist with the version ID.

Figure 8:
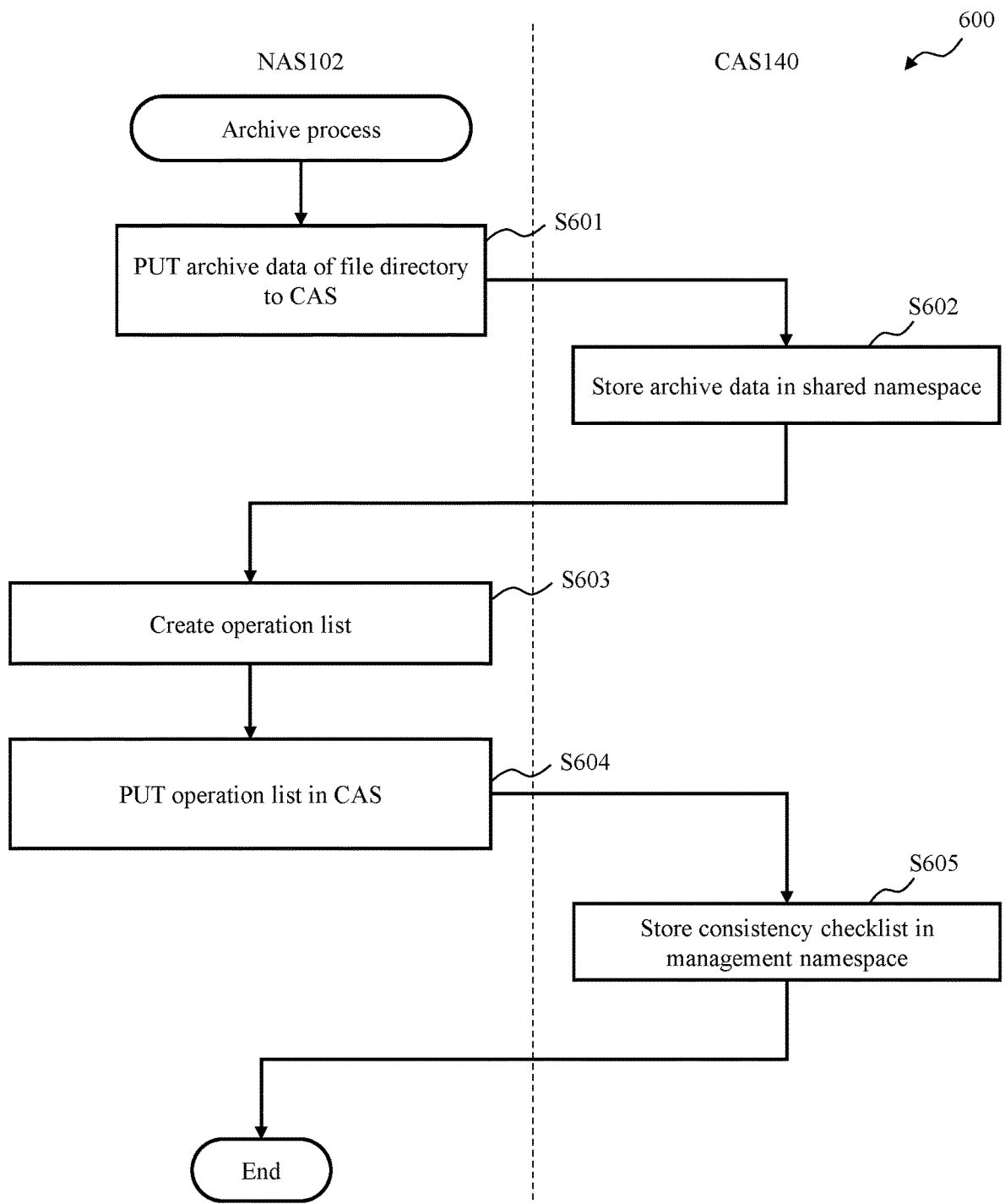
FIG. 8 is an example of a flow chart of an archive process 600.

FIG. 8 is an example of a flow chart of an archive process 600. The CPU 205 of the NAS controller 201 executes the archive program 211 in each of the NAS devices 102, 112, and 122 to execute the archive process 600. Note that the archive process 600 may be executed when a predetermined condition is satisfied. For example, the archive process 600 may be regularly or irregularly executed or may be executed when the client performs an operation for the file system of the client.

When the archive process is regularly executed, for example, the archive program 211 refers to an operation log for the file system to execute the archive process for each operation. The operation log includes the path of the file or the directory as the operation target, the details of the operation, the date and time of the operation, and the like. In this case, the archive program 211 executes the archive process from the oldest date and time of the operation.

The archive program 211 PUTS the archive data of the operated file or directory to the CAS controller 401 (S601). Specifically, for example, the archive program 211 designates the object ID corresponding to the operation target based on correspondence information not shown associating the paths of the files or the directories in the file system stored in the memory 203 and the object IDs in the file sharing namespace 141 and PUTS the archive data to the CAS controller 401.

The object version management program 409 of the CAS controller 401 receives the archive data of the operated file or directory and stores the archive data in the object of the file sharing namespace 141 corresponding to the directory or the file (S602). Then, the object version management program 409 transmits a response of PUT to the NAS controller 201.

The archive program 211 receives the response and transfers the process to the operation list creation program 212. The operation list creation program 212 creates the operation list 500 (S603). Specifically, for example, the operation list creation program 212 creates the operation list 500 including the update path 504 that is the path to the operation target, the operation type 505, the Current Consistency Number 502 of the NAS device at the execution of the operation, and the NAS identifier 502 of the NAS device based on the operation log and stores the operation list 500 in the memory 203. Then, the process is transferred to the archive program 211.

The archive program 211 PUTS the operation list 500 to the CAS controller 401 (S604).

The object version management program 409 of the CAS controller 401 receives the operation list 500 and provides the version ID 501 indicating the order of reception of the operation list 500, the update date and time 506 that is the reception date and time of the archive data, and the rotation flag 507 to create a consistency checklist. Then, the object version management program 409 adds the created consistency checklist to the consistency checklist group 410, stores the consistency checklist group 410 in the memory 403, transmits a response of PUT to the NAS controller 201, and ends the process.

The archive process 600 can reduce the waiting time for operating the file system in the computer system 10 including the plurality of NAS devices 102, 112, and 122 and can generate the consistency checklists for maintaining the coherence of data according to the order of reception of the archive data in the CAS device 140. Specifically, the CAS device 140 receives the archive data and the operation lists indicating the details of the operations and generates and stores the consistency checklists in which the version IDs are provided to the operation lists. That is, the consistency lists can store the order of reception of the archive data from the plurality of NAS devices 102, 112, and 122. Therefore, by using the consistency checklists in the synchronization process, the clients of the NAS devices 102, 112, and 122 can operate the file systems of the clients without waiting for the execution of the synchronization process. That is, the waiting time for the clients to operate the file systems can be reduced.

Figure 9:
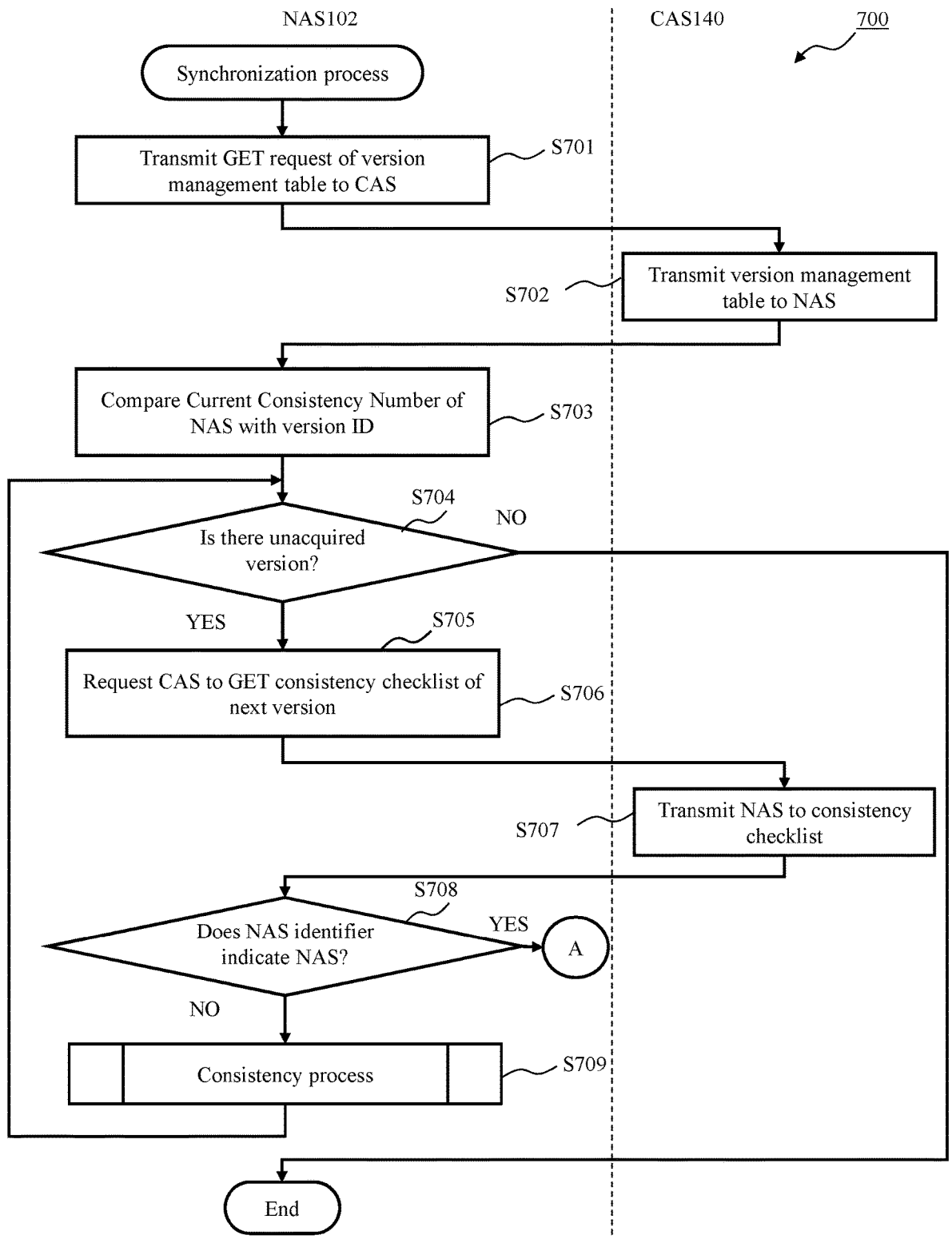
FIG. 9 is an example of a flow chart of a synchronization process 700.

FIG. 9 is an example of a flow chart of a synchronization process 700. The CPU 205 of the NAS controller 201 executes the synchronization program 213 in each of the NAS devices 102, 112, and 122 to execute the synchronization process 700. Note that the synchronization process 700 may be executed at any timing. For example, the synchronization process 700 is executed based on a condition set in advance. For example, the synchronization process 700 may be regularly or irregularly executed at a timing set in advance, may be executed when the client transmits a read request for a file or a directory in the file system included in the NAS device 102 of the sub computer system, or may be executed based on other conditions. Note that the configurations may be performed by the client at each site or may be performed by a management apparatus not shown coupled to the NAS device. Furthermore, the configurations may be performed by the management apparatus coupled to the CAS device.

The synchronization program 213 transmits a GET request of the version management table 411 to the CAS controller 401 (S701). For example, the object ID of the object in the management namespace 144 storing the version management table 411 is designated in the GET request.

The object version management program 409 of the CAS controller 401 receives the GET request and transmits the version management table 411 of the designated object to the NAS controller 301 (S702).

The synchronization program 213 GETs the version management table 213. Then, the synchronization program 213 compares the version ID 501 of the version management table 213 with the Current Consistency Number 104 in the memory 203 of the NAS device (S703).

The synchronization program 213 determines whether there is an unacquired version of the consistency checklist (S704). Specifically, for example, the synchronization program 213 determines, for the unacquired version, whether the version management table 213 includes the version ID 501 newer than the Current Consistency Number 104 in the memory 203 of the NAS device.

If there is no unacquired version (No in S704), the synchronization program 213 ends the process. On the other hand, if there is an unacquired version (Yes in S704), the synchronization program 213 advances the process to S705.

The synchronization program 213 transmits, to the CAS controller 401, a GET request of the consistency checklist with the version ID 501 next to the Current Consistency Number in the memory 203 of the NAS device (S705).

The object version management program 409 receives the GET request and transmits the consistency checklist with the designated version ID 501 to the NAS controller 301 (S707).

The synchronization program 708 receives the consistency checklist and determines whether the NAS identifier 502 included in the received consistency checklist is the identifier of the NAS device of the sub computer system (S708). Hereinafter, the received consistency checklist will be called a target list in the description of the flow.

If the NAS identifier 502 included in the target list indicates an NAS device other than the NAS device of the sub computer system (No in S708), the synchronization program 708 executes a consistency process (S709) and returns the process to S704. Note that the Current Consistency Number in the memory 203 is updated to the version ID of the consistency checklist in the consistency process. On the other hand, if the NAS identifier 502 included in the target list indicates the NAS device of the sub computer system (Yes in S708), the synchronization program 708 advances the process to S805 (FIG. 9; A). Note that the Current Consistency Number in the memory 203 is updated to the version ID of the consistency checklist in the consistency process.

The synchronization process 700 can sequentially reflect the operations on the file systems, from the consistency checklist with the oldest version ID. As a result, the file systems 103, 113, and 123 on the NAS devices 102, 112, and 122 can be operated according to the order of reception of the archive data in the CAS device 140, and the coherence of data can be maintained.

Although the version IDs can be compared to determine the order of the consistency checklists PUT to the CAS device 140 in FIG. 9, the update date and time 506 of the consistency checklists may be used to determine the order.

Specifically, the CAS device 140 manages the versions of the state of the file sharing namespace 141 according to the order of reception of the archive data. The NAS device sequentially reflects the state on the file system of the NAS device in the synchronization process 700. Therefore, the coherence of data between the file systems and the file sharing namespace 141 can be maintained regardless of the timing of the execution of the synchronization process 700.

Furthermore, the client can also access the files or the directories in the latest state by configuring to execute the synchronization process 700 when there is a read request for the file system.

Figure 10:
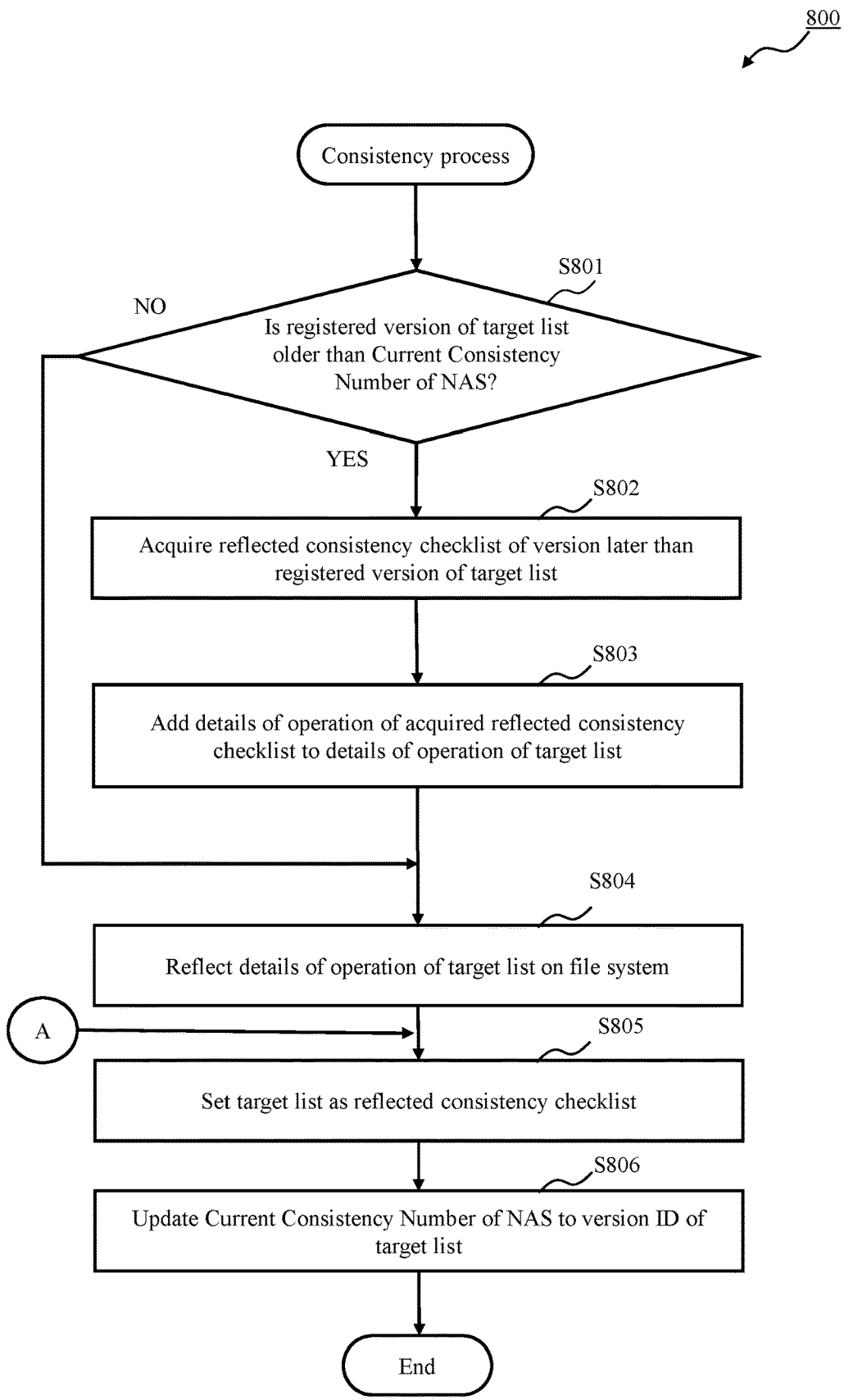
FIG. 10 is an example of a flow chart of a consistency process 800.

FIG. 10 is an example of a flow chart of a consistency process 800. The consistency process 800 is a process of S709 of the synchronization process 700. Note that the synchronization program 213 executes the consistency process based on the consistency checklist (target list) received in S708.

The synchronization program 213 compares the registered version 503 of the target list with the Current Consistency Number 104 in the memory 203 of 47 the NAS device and determines whether the registered version 503 of the target list is older than the Current Consistency Number 104 of the NAS device (S801).

If the registered version 503 is newer than the Current Consistency Number 104 of the NAS device (No in S801), the synchronization program 708 advances the process to S804. On the other hand, if the registered version 503 is the same or older than the Current Consistency Number 104 of the NAS device (Yes in S801), the synchronization program 213 advances the process to S802.

The synchronization program 213 acquires the reflected consistency checklist 209 including the registered version 503 newer than the registered version 503 of the target list from the memory 203 (S802). Note that the reflected consistency checklist 209 is a consistency checklist in which the operation is reflected on the file system.

The synchronization program 213 adds the details of the operation of the reflected consistency checklist 209 to the details of the operation of the target list (S803). For example, the synchronization program 213 rewrites the operation target of the target list with the operation target of the reflected consistency checklist acquired in S802.

The synchronization program 213 executes the operation (operation type 505, update path 504) of the target list (S804).

The synchronization program 213 stores the target list in the memory 203 as the reflected consistency checklist 209 (S805).

The synchronization program 213 updates the Current Consistency Number 104 of the NAS device to the version ID of the target list (S806).

The consistency process 800 can reflect the consistency information on the file system based on the registered version 503 of the target list and the Current Consistency Number 104 of the NAS device. As a result, the operations can be sequentially reflected from the file systems in which the operations are performed. Specifically, when the registered version 503 of the target list is older than the Current Consistency Number 104 of the NAS device, the details of the operation of the reflected consistency checklist newer than the Current Consistency Number 104 of the NAS device can be included in the details of the operation of the target list. For example, this is equivalent to rewriting the already reflected file name (path) that is the operation target with the operation target of the target list. This can prevent a trouble, such as the path to the operation target of the target list cannot be found due to the already performed operation, and can maintain the coherence of data. Note that although the already reflected operation target is rewritten with the operation target of the target list in the example illustrated in the present Embodiment, any mode can be adopted as long as the already reflected details of the operation are included in the details of the operation of the target list.

Furthermore, the NAS device can store the already reflected consistency checklist in the NAS device to reduce the load caused by GETTING the same consistency checklist from the CAS device 140 again.

Figure 11:
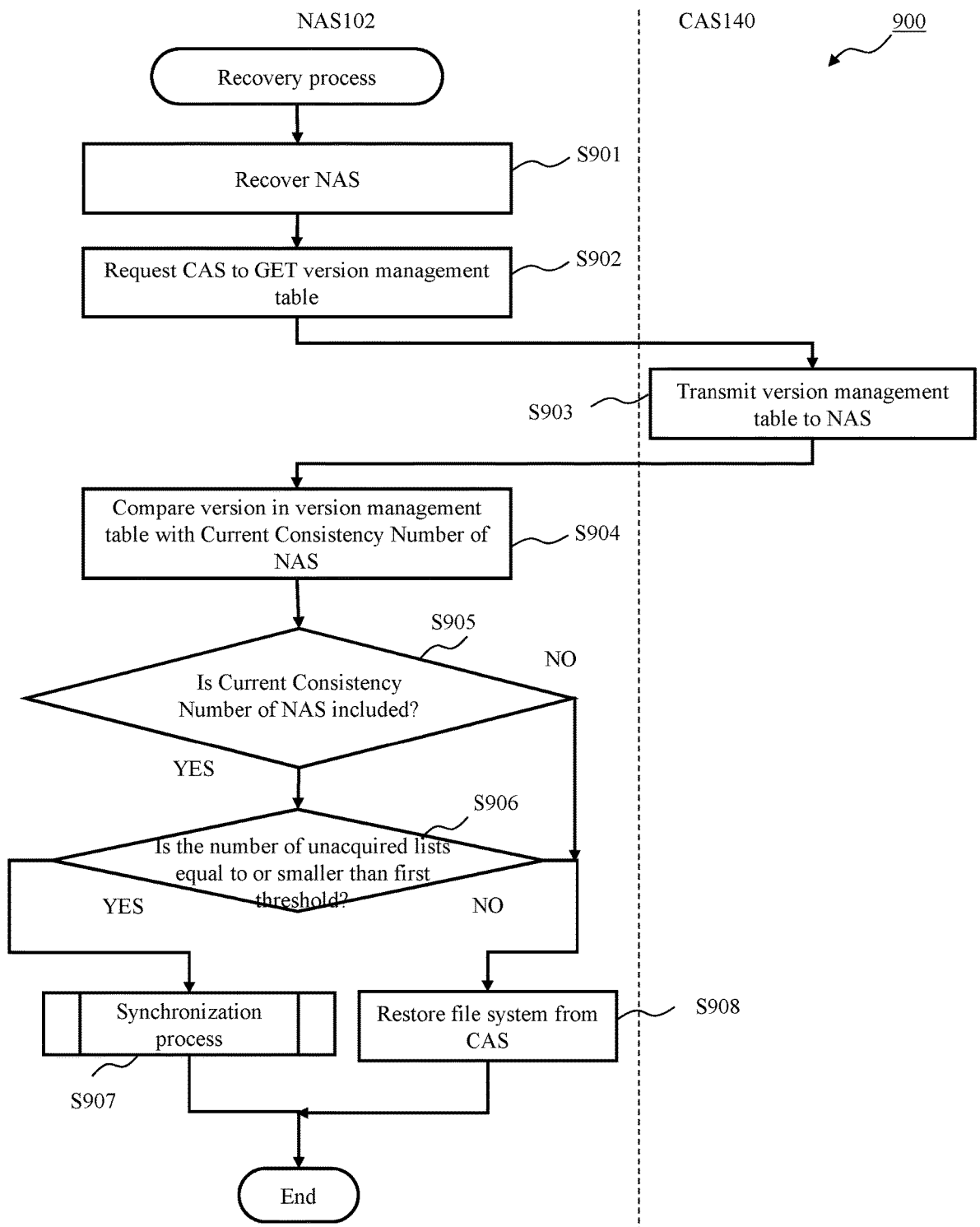
FIG. 11 is a flow chart of a recovery process 900.

FIG. 11 is a flow chart of a recovery process 900. The CPU 205 of the NAS controller 201 executes the recovery program 216 in each of the NAS devices 102, 112, and 122 to execute the recovery process 900. Note that the recovery process 900 is a process executed when there is a failure in the NAS device 102. For example, the failure denotes stopping of the operation of the NAS device 102 due to a power failure or a network failure.

The recovery program 216 recovers the NAS device 102 (S901). For example, when the network failure is removed, the recovery program 216 restarts the NAS device 102.

The recovery program 216 transmits a GET request of the version management table 411 to the CAS controller 401 (S902).

The object version management program 409 of the CAS controller 401 receives the GET request and transmits the version management table 411 to the NAS controller 301 (S903).

The recovery program 216 receives the version management table 213. Then, the recovery program 216 compares the version ID 501 of the version management table 213 with the Current Consistency Number 104 in the memory 203 of the NAS device (S904).

The recovery program 216 determines whether the Current Consistency Number 104 in the memory 203 of the NAS device is included in the version management table 213 (S905).

If the Current Consistency Number 104 in the memory 203 of the NAS device is included in the version management table 213 (Yes in S905), the recovery program 216 executes the synchronization process 700 (S907) and ends the process. On the other hand, if the Current Consistency Number 104 in the memory 203 of the NAS device is included in the version management table 213 (No in S905), the recovery program 216 advances the process to S908.

The recovery program 216 determines whether the number of unacquired consistency checklists is equal to or smaller than a first threshold set in advance (S906). For example, the number of unacquired consistency checklists is the number of consistency checklists including the version IDs 501 newer than the Current Consistency Number 104 in the memory 203 of the NAS device in the version management table 213.

If the number of unacquired consistency checklists is equal to or smaller than the first threshold (Yes in S906), the recovery program 216 executes the synchronization process 700 based on the unacquired consistency checklists (S907) and ends the process. On the other hand, if the number of unacquired consistency checklists is larger than the first threshold (No in S906), the recovery program 216 advances the process to S908.

The recovery program 216 GETs the archive data in all objects of the file sharing namespace 141 of the CAS device 140, restores the archive data in the file system (S908), and ends the process.

The recovery process 900 allows the NAS device to reflect the file system through the synchronization process 700 even if there is a failure in the NAS device. Furthermore, when the unreflected versions exceed the threshold set in advance, restoring the archive data in the CAS device is more efficient than executing the synchronization process 700. In such a case, the load on the computer system can be reduced by restoring the archive data.

Figure 12:
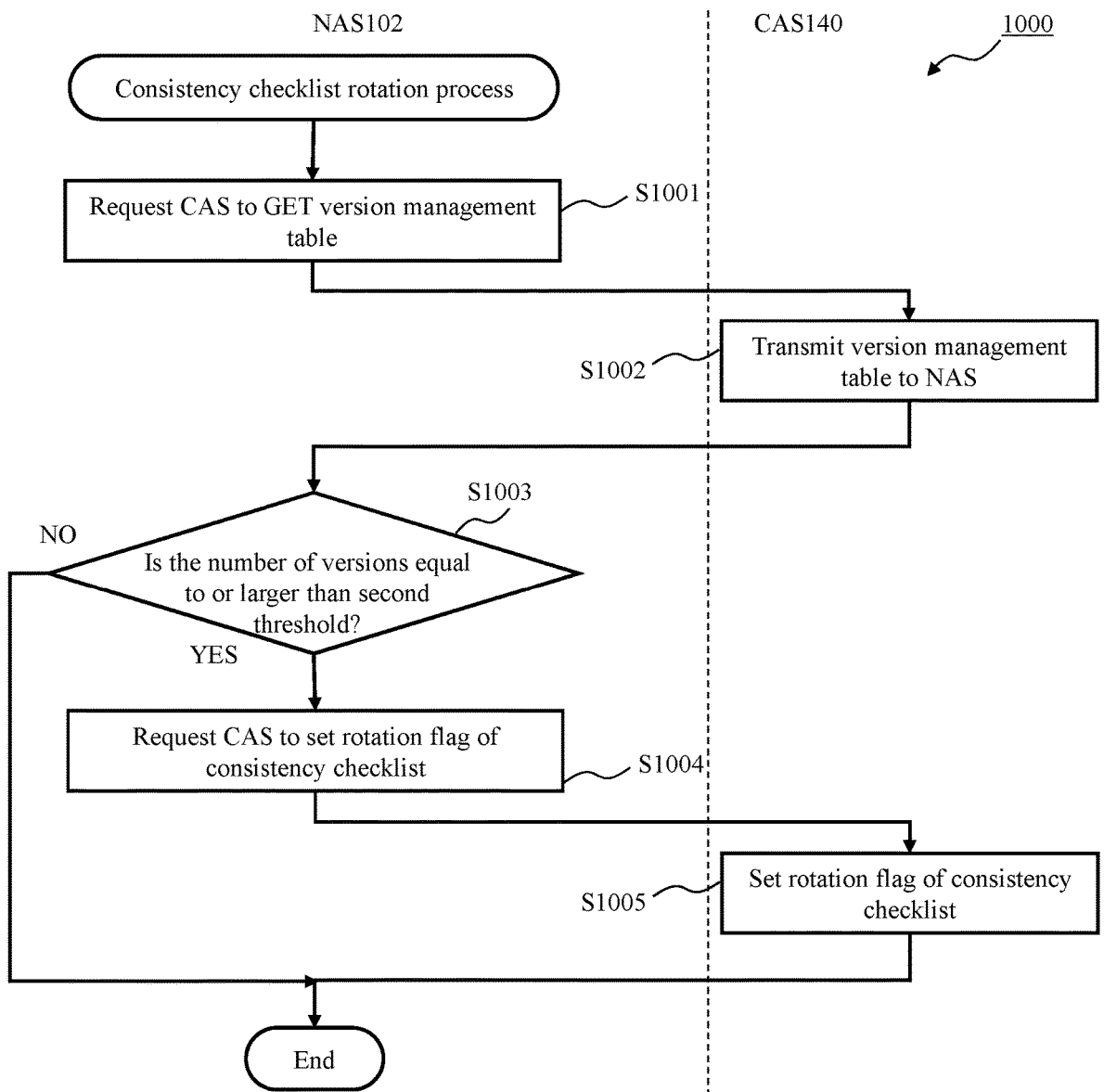
FIG. 12 is a flow chart of a consistency checklist rotation process 1000.

FIG. 12 is a flow chart of a consistency checklist rotation process 1000.

The CPU 205 of the NAS controller 201 of an arbitrary NAS device 102, 112, or 122 executes the operation list creation program 212 to execute the consistency checklist rotation process 1000. Note that the consistency checklist rotation process may be executed at any timing. For example, the consistency checklist rotation process may be regularly executed or may be executed after the archive process or the synchronization process 700.

The operation list creation program 212 transmits a GET request of the version management table 411 to the CAS controller 401 (S1001).

The object version management program 409 of the CAS controller 401 receives the GET request and transmits the version management table 411 to the NAS controller 301 (S1002).

The operation list creation program 212 receives the version management table 213. Then, the operation list creation program 212 determines whether the number of version IDs 501 included in the version management table 213 is equal to or larger than a second threshold set in advance (S1003).

If the number of version IDs 501 is smaller than the second threshold (No in S1003), the operation list creation program 212 ends the process.

On the other hand, if the number of version IDs 501 is equal to or larger than the second threshold (Yes in S1003), the maximum number of consistency checklists in the group in the consistency checklist group is set to the second threshold, and a setting request of rotation flags for the version IDs exceeding the maximum number is transmitted to the CAS controller 401 (S1004). For example, when the second threshold is 100, and the version IDs included in the received version management table 213 is V1 to V102, the operation list creation program 212 determines that the number of version IDs 501 is equal to or larger than the second threshold. Then, the operation list creation program 212 transmits a setting request of rotation flags for V101 and V102 to the CAS controller 401.

The object version management program 409 of the CAS controller 401 receives the setting request, sets the rotation flags 507 for the version IDs exceeding the maximum number in the consistency checklists and the version management table 213 (S1005), and ends the process. In the example, the object version management program 409 sets "1" for the rotation flags of V101 and V102 of the consistency checklists and the version management table 213.

As a result of the consistency checklist rotation process 1000, the CAS controller 401 manages the group of the consistency checklists including the version IDs provided with the rotation flags and later version IDs (in the example, the consistency checklists including the version IDs of version V101 and later versions) as a new consistency checklist group different from the existing consistency checklist group 410. The new consistency checklist group is handled as an object different from the existing consistency checklist group 410, and a new object ID is provided.

Furthermore, the CAS controller 401 manages the version IDs provided with the rotation flags and later version IDs in a new version management list. The new version management table is handled as an object different from the existing version management table 411, and a new object ID is provided. Note that the new consistency checklist group is provided with an object ID different from the existing consistency checklist group 410. Note that the CAS controller 401 may move the consistency checklists provided with the rotation flags and already included in the existing consistency checklist group to a new consistency checklist group.

Although the rotation flags are set to rotate the consistency checklists in FIG. 12, the method is not limited to this. For example, the CAS controller 401 may provide a special version ID in response to the rotation request from the NAS device or may change the state to a special state such as "deleted version".

The consistency checklist rotation process 1000 prevents the entries of the versions of the version management table 411 in the version management table from exceeding the maximum number. This can reduce the load of GETTING the version management lists in the synchronization process 700.

Furthermore, the maximum number of the number of consistency checklists in the consistency checklist group is determined by the consistency checklist rotation process 1000, and the management load of the consistency checklist group can be reduced.

Although the consistency checklist rotation process 1000 is executed by an arbitrary NAS device, the method is not limited to this. A predetermined NAS device may execute the consistency checklist rotation process 1000, or an NAS device that has noticed the fact that the version IDs included in the consistency checklist group 410 has exceeded the maximum number may execute the consistency checklist rotation process 1000. Furthermore, the CAS device may execute the process.

Although some Embodiments have been described above, the present invention is not limited to the Embodiments, and it is obvious that various changes can be made without departing from the scope of the present invention.

REFERENCE SIGNS LIST

10 . . . computer system, 102, 112, 122 . . . NAS devices, 103, 1113, 123 . . . file systems, 140 . . . CAS device, 201 . . . NAS controller, 141 . . . file sharing namespace, 144 . . . management namespace

The invention claimed is:
1. A computer system comprising:
a plurality of file storage apparatuses; and
an archive storage apparatus coupled to the plurality of file storage apparatuses,
wherein each of the plurality of file storage apparatuses is configured to
store that file storage apparatus's own copy of a file system,
operate on that file storage apparatus's copy of the file system, and
after operating on that file storage apparatus's copy of the file system, transmit target data that was a target of the operation in association with operation information indicating a type of the operation to the archive storage apparatus,
wherein the archive storage apparatus is configured to
receive the target data and the associated operation information from one or more of the plurality of file storage apparatuses, and
for each target data and associated operation information received from the one or more file storage apparatus,
store the target data, and
store consistency information, including the associated operation information in association with a version indicator indicating an order of reception of the associated operation information, in a consistency checklist,
wherein a first file storage apparatus of the plurality of file storage apparatuses is configured to execute a synchronization process of
acquiring the consistency checklist from the archive storage apparatus,
correcting inconsistency between different consistency information in the acquired consistency checklist based on the version indicators in the different consistency information, and updating the first file storage apparatus's copy of the file system to reflect the corrected consistency checklist,
wherein the archive storage apparatus is configured to
store the consistency information in a first area, and
store a version list for managing the version indicators included in the consistency information in order of version indicators,
wherein the first file storage apparatus is configured to
acquire the version list from the archive storage apparatus, and
transmit, to the archive storage apparatus, a request of setting flags on the consistency information in a range exceeding a first threshold when a number of versions included in the version list exceeds the first threshold, and
wherein the archive storage apparatus is configured to
set the flags on the consistency information in the first area according to the setting request, and
move the consistency information provided with the flags to a second area different from the first area.
2. The computer system according to claim 1, wherein correcting inconsistency between conflicting consistency information comprises adding details of operations indicated by first consistency information having an earlier version indicator to details of operations indicated by second consistency information having a later version indicator.

3. The computer system according to claim 2, wherein the first file storage apparatus is configured to:
  store a most recent version indicator included in the acquired consistency checklist as a current version for the first file storage apparatus's copy of the file system when the synchronization process is finished; and
  subsequently acquire a consistency checklist including consistency information with a version indicator immediately following the current version.

4. The computer system according to claim 3, wherein
  each of the plurality of file storage apparatuses is configured to, when operating on that file storage apparatus's copy of the file system, include the current version of that file storage apparatus's copy of the file system at the time of execution of the operation as a registered version in the operation information, and
  the first file storage apparatus is configured to update the first file storage apparatus's copy of the file system to reflect the consistency checklist based on the registered versions included in the operation information in the consistency information in the acquired consistency checklist.

5. The computer system according to claim 4, wherein
  the first file storage apparatus is configured to, after updating the first file storage apparatus's copy of the file system to reflect the corrected consistency checklist, store the consistency checklist as a reflected consistency checklist, and
  in the synchronization process, the first file storage apparatus is configured to, for each of the consistency information in the consistency checklist, if the current version of the first file storage apparatus's copy of the file system is more recent than the registered version included in the operation information in the consistency information, rewrite an operation included in the consistency information, based on an operation included in the reflected consistency checklist, prior to updating the first file storage apparatus's copy of the file system.

6. The computer system according to claim 5, wherein the first file storage apparatus is configured to execute the synchronization process at a timing set in advance.

7. The computer system according to claim 5, wherein the first file storage apparatus is configured to execute the synchronization process, when there is a read request to the first file storage apparatus's copy of the file system, prior to executing the read request.

8. The computer system according to claim 7, wherein when the first file storage apparatus is recovering from an interruption, the first file storage apparatus is configured to
  determine whether the current version is included in the version list,
  calculate a number of unacquired consistency information based on the version list when the current version is included,
  determine whether the number of unacquired consistency information is equal to or smaller than a second threshold, and
  acquire the unacquired consistency information to execute the synchronization process when the number of unacquired consistency information is equal to or smaller than the second threshold.

9. The computer system according to claim 8, wherein the first file storage apparatus is configured to restore the first file storage apparatus's entire copy of the file system when the number of unacquired consistency information exceeds the second threshold.

10. A file storage controller coupled to a file storage device and an archive storage apparatus, the file storage controller configured to:
  store a copy of a shared file system in the file storage device;
  operate on the copy of the shared file system;
  after operating on the copy of the shared file system, transmit target data that was a target of the operation in association with operation information indicating a type of the operation to the archive storage apparatus;
  execute a synchronization process of
    acquiring a consistency checklist, including, for each of one or more operations performed by a plurality of file storage apparatuses, consistency information comprising the operation information and a version indicator indicating an order of reception of the operation information by the archive storage apparatus, from the archive storage apparatus,
    correcting inconsistency between different consistency information in the acquired consistency checklist based on the version indicators in the different consistency information, and
    updating the copy of the shared file system to reflect the corrected consistency checklist;
  acquire a version list, stored at the archive storage apparatus for managing the version indicators included in the consistency information in order of version indicators, from the archive storage apparatus; and
  transmit, to the archive storage apparatus, a request of setting flags on the consistency information in a range exceeding a threshold when a number of versions included in the version list exceeds the threshold, to cause the archive storage apparatus to set the flags on the consistency information in a first area according to the setting request, and move the consistency information provided with the flags to a second area different from the first area.

11. A data sharing method by a plurality of file storage apparatuses coupled to an archive storage apparatus, each of the plurality of file storage apparatuses configured to store that file storage apparatus's own copy of a file system, the data sharing method comprising:
  by a first file storage apparatus of the plurality of file storage apparatuses,
    operating on the first file storage apparatus's copy of the file system,
    after operating on the first file storage apparatus's copy of the file system, transmitting target data that was a target of the operation in association with operation information indicating a type of the operation to the archive storage apparatus, and
    executing a synchronization process of
      acquiring a consistency checklist, including, for each of one or more operations performed by the plurality of file storage apparatus, consistency information comprising the operation information and a version indicator indicating an order of reception of the operation information by the archive storage apparatus, from the archive storage apparatus,
      correcting inconsistency between different consistency information in the acquired consistency checklist based on the version indicators in the different consistency information, and
      updating the first file storage apparatus's copy of the file system to reflect the corrected consistency checklist;

by the archive storage apparatus,
    storing the consistency information in a first area, and
    storing a version list for managing the version indicators included in the consistency information in order of version indicators;
by the first file storage apparatus,
    acquiring the version list from the archive storage apparatus, and
    transmitting, to the archive storage apparatus, a request of setting flags on the consistency information in a range exceeding a threshold when a number of versions included in the version list exceeds the threshold; and,
by the archive storage apparatus,
    setting the flags on the consistency information in the first area according to the setting request, and
    moving the consistency information provided with the flags to a second area different from the first area.

* * * * *